United States Patent [19]

Hoefelmayr

[11] 4,253,420

[45] Mar. 3, 1981

[54] COLLECTING PIECE

[75] Inventor: Tilman Hoefelmayr, Niederteufen, Switzerland

[73] Assignee: Bio-Melktechnik Swiss Hoefelmayr & Co., Niederteufen, Switzerland

[21] Appl. No.: 72,710

[22] Filed: Sep. 4, 1979

[30] Foreign Application Priority Data

Sep. 5, 1978 [DE] Fed. Rep. of Germany ....... 2838705

[51] Int. Cl.³ ............................ A01J 5/00; A01J 5/04
[52] U.S. Cl. .................................................. 119/14.55
[58] Field of Search ............... 119/14.54, 14.55, 14.36, 119/14.37, 14.45, 14.29; 137/103

[56] References Cited

U.S. PATENT DOCUMENTS

| 1,119,214 | 12/1914 | Anderson | 119/14.45 X |
| 2,425,873 | 8/1947 | Gessler | 119/14.55 |
| 3,209,727 | 10/1965 | Fukutome | 119/14.37 |

Primary Examiner—Hugh R. Chamblee
Attorney, Agent, or Firm—Blanchard, Flynn, Thiel, Boutell & Tanis

[57] ABSTRACT

A collecting piece incorporating a pair of relatively movable members which function as a valve to control the supply of a vacuum to all four milking cups of a quarter milking machine while maintaining the milk supplied from each of the milking cups separate from one another. Each of the lines connected to each of the pair of movable members of the connecting piece terminate in an opening which is flush with a sliding surface on each of the two relatively movable members. Thus, rotating one of the members relative to the other will either bring the openings into alignment with each other or cause the openings to remain out of alignment with each other. If desired, a locking mechanism can be provided for locking the two relatively movable members in the two positions thereof.

14 Claims, 7 Drawing Figures

COLLECTING PIECE

FIELD OF THE INVENTION

The invention relates to a collecting piece having several, in particular four supply lines for connection to each milking cup.

BACKGROUND OF THE INVENTION

According to corresponding findings of leading scientists, every other cow has subclinic mastitis. This means, for example, that in the Federal Republic of Germany alone, an economic loss of at least 5 million DMs per year is sustained. The agent of udder diseases is transmitted practically exclusively through the line channel opening. Therefore, for many years widely spread intensive efforts have been made to reduce the transmission agent by precise hygienic precautionary measures. These additional measures consist in particular in a very exact udder cleaning and drying of the teats with disposable paper towels prior to milking, disinfecting the milking tool between each cow, dipping the teats into a disinfecting solution after each milking operation and placing all cows on long-term antibiotics. In spite of these expensive hygienic measures which have been used for many years, the rate of new infections has not been appreciably reduced. This fact proves that the transmission of infections must take place indeed during the removal of milk from the udder. For this reason, the role of the milking machine in the transmission of mastitis lately appears in a new light and scientists all over the world now intensively refer to the milking machine as a mastitis transmitter. Newer examinations have proven that the milk, during a milking operation using a milking tool which is common today, flows in the milking tool not only away in one direction from the teat, but also more or less regularly flows back from the collecting piece toward the teats. This return flow can, as has been proven, transmit microorganisms from a diseased quarter of the udder onto the still healthy quarter of the same cow or the next cows to be milked. It is assumed that in this one must find the most frequent cause for the newly occurring mastitis infections. The return flow of milk is caused primarily by two mostly independent causes: By the pump action of the pulsating teat rubber and by the air penetration during mounting and removing of the milking tool and by infiltrated air at the head of the teat rubber.

Very undesirable cyclic vacuum variations inside of the milking cup are created during the milking operation in the pump supply line of the pulsating teat rubber, reinforced by the mass moment of inertia of the milk which is transported in the milking tool. Up to now, one has tried to avoid said pressure variations and the associated return flow of milk contacting the tip of the teat by providing an enlarged volume in a collecting piece. However, the milk is obviously converted into fine aerosols, this even more large the collecting piece is. Due to pressure differences in the individual milking cups, it can hereby be effected that said aerosols are accelerated to a speed of up to 20 meters per second against another teat and due to this high speed permeate directly through the healthy closing muscle. Such pressure differences occur in particular in the case of an alternate rhythm operation, as when one side closes, while the other side opens. Even more dangerous is the air infiltration, which may be caused by a poorly fitting milking tool or particularly easily toward the end of a milking operation when the udder is less full. The teat, when the air infiltration occurs at the teat rubber, is not endangered, but rather due to the pressure drop the remaining teats may be endangered. For this reason, a total separation of the milk discharge from the individual udder quarters (quarter milking machine) appears to be urgently needed.

Quarter milking machines according to the two-chamber principle have been known already for a long period of time for effecting a determination for breeding purposes of the distribution of the milk output of the individual quarters of a cow. In the case of the common quarter milking machines, in which as a collecting piece four suitably bent small pipes, with the nominal diameter of the milking hoses, are connected to one unit; however, enormous cyclic vacuum variations occur, which could result in vacuum peaks being reached almost up to the absolute vacuum. However, the teats have been mechanically damaged through this, for which reason such quarter milking machines are out of the question for continuous use in a milking operation.

In a different conventional quarter milking machine, the disadvantages of the strong cyclic vacuum variations are overcome by totally doing away with a pulsation (so-called one-chamber cup). However, such machines were unable to be successful, because based on the nonexisting pressure stimulation of the cow through the pulsation operation of the teat rubber, the milk output and the length of the lactation period of the cows dropped substantially in comparison with other standard machines.

A satisfactory quarter milking machine could be realized only after the system of the periodic air infiltration in the relief phase and a corresponding milking cup with a valve controlled by a pulsator was developed. Only based on this development did it become possible to abandon an otherwise needed damping volume, which was necessarily provided in the collecting piece.

In a collecting piece with only one milk discharge line, as they are common up to now, a blocking off of the vacuum can be achieved in a simple manner prior to or after applying the milking cup to the teat, by the discharge line having been closed off with the help of a simple hose clamp or with the help of a lock which is provided in the collecting piece and which works either automatically or manually. With this, it was possible with the help of one single lock to block off or apply the vacuum simultaneously to all four teats. However, in the case of a quarter milking machine, four milk discharge lines are provided. It is considered to be extremely annoying and particularly work-consuming, if at the start or at the end of the milking operation the vacuum must be applied or switched off separately in all four milk discharge lines.

Therefore, the basic purpose of the present invention is to provide a quarter milking machine collecting piece, which is as compact as possible and permits with the help of one single manipulation to apply the vacuum to all four milking cups.

This purpose is inventively attained by providing a collecting piece of the above-mentioned type, wherein the ends of the supply lines each terminate in one common first sliding surface, wherein a second sliding surface sealingly engages against the first sliding surface, wherein a number of discharge lines which correspond with the number of the supply lines are provided, the ends of which each lie in the second sliding surface and extend therethrough, wherein the first and the second sliding surface is rotatable or movable relative to one another and wherein the ends of the supply lines are arranged in relationship to the ends of the discharge lines such that in a first position of the two sliding surfaces, the ends of all supply lines are aligned with the ends of all discharge lines, and that in a second position of the two sliding surfaces the second sliding surface closes off the ends of all supply lines and the first sliding surface closes off the ends of all discharge lines.

As a result, it is possible with one single manipulation, through which the two sliding surfaces are moved or rotated relative to one another, either to connect the vacuum which exists on all discharge lines simultaneously to all milking cups or to disconnect same therefrom.

The collecting piece is preferably constructed in such a manner that a pulsator pressure distributor piece is constructed with a supply line to a milking cup and a supply line to the quarter piece for an intermittent operation or two supply lines to the distributor piece for an alternate rhythm operation on one of the sliding surfaces, preferably on the first sliding surface. From this results a particularly compact arrangement in that all milk discharge lines and also pulsator underpressure lines run together and are combined at the collecting piece.

An arrangement is considered as particularly preferable from a technological milking standpoint and from an udder health standpoint, with which both the underpressure from all milk discharge lines can be applied with one manipulation to the milking cup and also simultaneously with the same manipulation the pulsator pressure to all milking cups. This is achieved with the help of a collecting piece, which is designed such that the end of the one supply line to the pulsator pressure distributor piece for the intermittent operation or the ends of the two supply lines to the pulsator pressure distributor piece for the push-pull operation each terminate in the first sliding surface and that a number of connecting lines, which number corresponds with the number of the supply lines to the pulsator pressure distributor piece are provided with the pulsator, the end or ends of which each lie in the second sliding surface and extend therethrough, and that the end of the supply line or the ends of the supply lines are arranged in relationship to the end of the connecting line or the ends of the connecting lines such that these are aligned with one another in the first position of the two sliding surfaces and in the second position of the two sliding surfaces are each closed off by these.

A preferable development of the collecting piece can consist in the first and the second sliding surface each consisting of one circular disk, which can be rotated relative to one another.

An arrangement has also proven to be particularly strong and particularly well sealing, in which the first and the second sliding surface each consist of a conical surface, which while sliding on one another are rotatable relative to one another.

To reduce the friction of the two sliding surfaces on one another with a simultaneous good seal and to thus improve the handiness of the collecting piece, at least one of the two sliding surfaces is coated with a solid material which improves the sliding characteristic, preferably a polymer plastic. A coating with a polytetrafluoroethylene (Teflon) has proven to be particularly preferable.

In order to make the adjusting of the collecting piece to the first or second position, namely, the two sliding surfaces relative to one another easier, cooperating locking mechanisms are preferably constructed on the two sliding surfaces, which mechanisms engage with one another in the first and the second position of the sliding surfaces.

A particularly strong and compact design of the collecting piece is obtained by the collecting piece consisting of a first inverted cup-shaped part, the edge of which extends conically enlarging outwardly and on the inside of which there is constructed the first sliding surface, and of a second truncated-cone-shaped part, on the outer side of which there is constructed the second sliding surface.

It is particularly important that the collecting piece be constructed such that it does not permit the penetration of dirt, has as much as possible no cavities, in which milk can settle and that the collecting piece can still be easily disassembled in order to clean it. These requirements are achieved particularly with the help of a collecting piece of the above-mentioned type, which is designed such that in the bottom of the inverted cup-shaped part there is provided a push rod which extends concentrically in axial direction through said part, is initially tensioned outwardly by a spring and projects outwardly, that on the end of the push rod, which end lies on the inside, there is secured a pin which extends transversely with respect to said push rod, such that the push rod is axially movable, however, is guided fixed against a relative rotation, and that in the end of the truncated-cone-shaped part, which end faces the inverted cup-shaped part, there are constructed two guideways which receive the ends of the pin in form of a bayonet lock.

The adjustments for the first and the second position of the sliding surfaces to one another can in this case be easily achieved, by the guideways having two locking recesses which correspond with the first and the second rotary positions of the sliding surfaces.

An unintended disassembling of the collecting piece during a rotation of the parts of the collecting piece relative to one another can be avoided by the collecting piece being constructed such that the guideways each have between their inlet openings and the locking recesses for the first and the second rotary positions a stop in the form of an elevation in the cam surface such that the bayonet lock can be released only by an axial inward movement of the push rod and simultaneous rotation of the inverted cup-shaped part and of the truncated-cone-shaped part relative to one another.

As has already become known through the principle of the milking cup having a valve, in which dependent on the control by the pulsator pressure, atmospheric air is let into the inside of the milking cup in the relief cycle, said air infiltration can take place also below the milking cup or also on the collecting piece. A particularly favorable development can now be achieved by such a pressure relief valve being combined directly with the collecting piece. The arrangement is such that on the pulsator pressure distributor piece there is provided in the case of an intermittent operation one or, in the case of an alternate rhythm operation, two pressure relief valves, which each contains or contain a diaphragm initially tensioned on its one side by a spring and is connected with a supply line to the pulsator pressure distributor piece and which is connected on its other side to a movable closure plug, which at an underpressure in the pulsator line interrupts a connecting line, which connects the atmosphere to a supply line to the inside of a milking cup.

A different preferred development is characterized by providing on the pulsator pressure distributor piece in the case of an intermittent operation one or, in the case of an alternate rhythm operation, two pressure relief valves, which each consists or consist of a ball check valve, which on the one side is connected to a supply line to the pulsator pressure distributor piece and on the other side to all supply lines to the milking cups in an intermittent operation or with each of two supply lines to the milking cups in a two-cycle operation.

BRIEF DESCRIPTION OF THE DRAWINGS

The invention will be discussed in more detail hereinbelow with reference to preferable exemplary embodiments illustrated in the drawings, in which.

DETAILED DESCRIPTION

Figure 1:
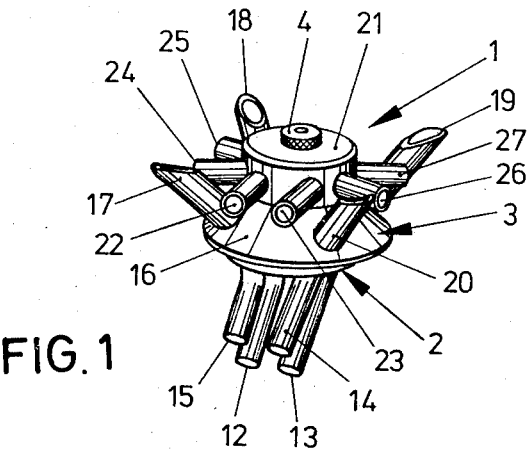
FIG. 1 is a perspective illustration of a quarter milking collecting piece embodying the invention.

The quarter milking collecting piece which is identified by the reference numeral 1 and is illustrated in general in FIG. 1 consists of two separable parts 2 and 3, which are held together with the help of a knurled nut 4 threadedly engaged with a bolt 5 (FIG. 2) which is provided with a thread and projects beyond the upper part 3. The lower part 2 has an approximately truncated-cone-shaped design and a conical surface 7 which extends downwardly and outwardly from the upper plane surface 6. The surface 7 is constructed as a sliding surface. The ends 8, 9, 10 and 11 of milk discharge conduits 12, 13, 14 and 15 terminate flush with the conical sliding surface 7. The upwardly projecting threaded bolt 5 is secured to the surface 6. The upper part 3 of the collecting piece consists of also a truncated-cone-shaped part 16 having an internal conical surface which extends downwardly and outwardly, to define a sliding surface which corresponds with the sliding surface 7 and is not shown. The ends of the conduits 17, 18, 19 and 20 to which the supply lines to the inner chambers of each associated milking cup can be connected, terminate flush with this not-illustrated sliding surface. An approximately cylinder-shaped pulsator pressure distributor piece 21 is furthermore constructed in one piece with the upper truncated-cone-shaped part 16 or is secured thereto. The illustrated pulsator pressure distributor piece 21 is specified for the alternate rhythm operation and has two supply lines 22 and 23 which are operated in counter rhythm. The supply line 22 is connected to the conduit connections 24 and 25 and the supply line 23 is connected to the conduit connections 26 and 27. The conduit connections 24, 25, 26 and 27 each can be connected to the pulsator pressure inlets of the corresponding milking cups. The two parts 2 and 3 are rotatable about their vertical longitudinal axis so that their sliding surfaces slide on one another and the two parts 2 and 3 can be rotated relative to one another between a first and a second rotary position. The ports of the conduits 17, 18, 19 and 20 in the upper part 3 are arranged especially in such a manner that said ports in a first rotary position of the two parts 2 and 3 are aligned with the ends 8, 9, 10 and 11 of the conduits 12 to 15 and that in a second rotary position the ports of the conduits 17 to 20 are closed off by the lower sliding surface 7 and the ends 8 to 11 of the conduits 12 to 15 through the upper sliding surface of the upper part 3. In this manner it is possible through a simple rotation of the parts 2 and 3 relative to one another to connect all four conduits 12 to 15 to the conduits 17 to 20. In order to easily find the respective rotary position and to be able to adjust same exactly, a locking mechanism (not shown) in the form of a ball which is initially tensioned by a spring is provided in the upper part 3, while corresponding locking recesses 28, 29 and 30 are provided in the surface 6 of the lower part 2 for receiving the ball therein.

Figure 2:
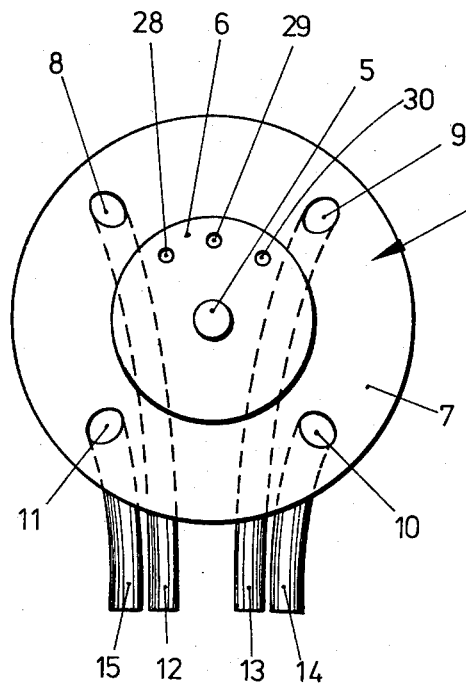
FIG. 2 is a top view of the lower part of the collecting piece illustrated in FIG. 1 after the upper part has been removed.
Figure 3:
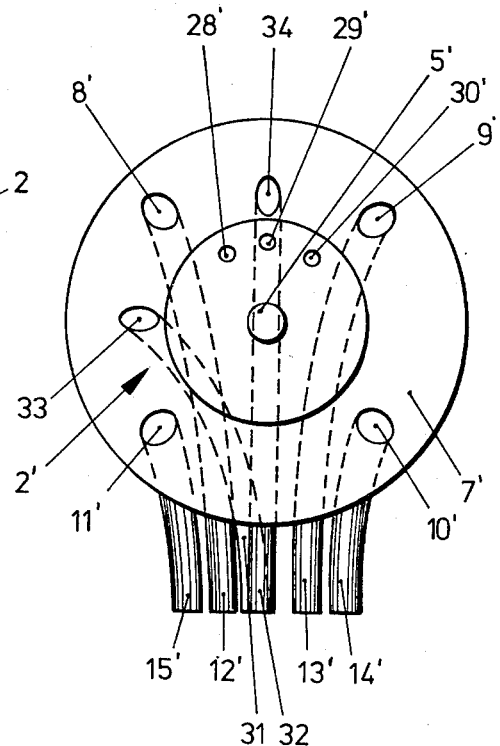
FIG. 3 is a view similar to FIG. 2 of a modified collecting piece.

A modified embodiment is illustrated in FIG. 3. The parts which correspond with the parts illustrated in FIG. 2 are identified by the same reference numerals, however, with the addition of a prime (') suffix. This embodiment will not be discussed in any further detail. However, in this embodiment, two further pulsator pressure supply lines 31, 32 are provided in the lower part 2' and terminate in openings 33, 34 which are flush with the sliding surface 7'. The pulsator pressure supply lines 22 and 23 which are shown in FIG. 1 are modified correspondingly so that their open ends which are visible in FIG. 1 terminate in the upper sliding surface of the upper part 3 at points which correspond with the rotary positions of the openings 33 and 34 in the lower sliding surface 7'. Thus, in this embodiment, the supply of the pulsator pressure occurs through the lines 31 and 32. Important is that naturally the conduits 22 and 23 which terminate in the upper sliding surface are aligned with one another in the same rotary position of the two parts 2 and 3, when also the openings of the milk conduits 12' to 15' and 17' to 20' are aligned with one another. In this manner, it is possible through a simple rotation of the two parts 2 and 3 relative to one another to simultaneously apply the underpressure to the inner chambers of the milking cups and also the pulsator pressure to the individual milking cups.

Figure 4:
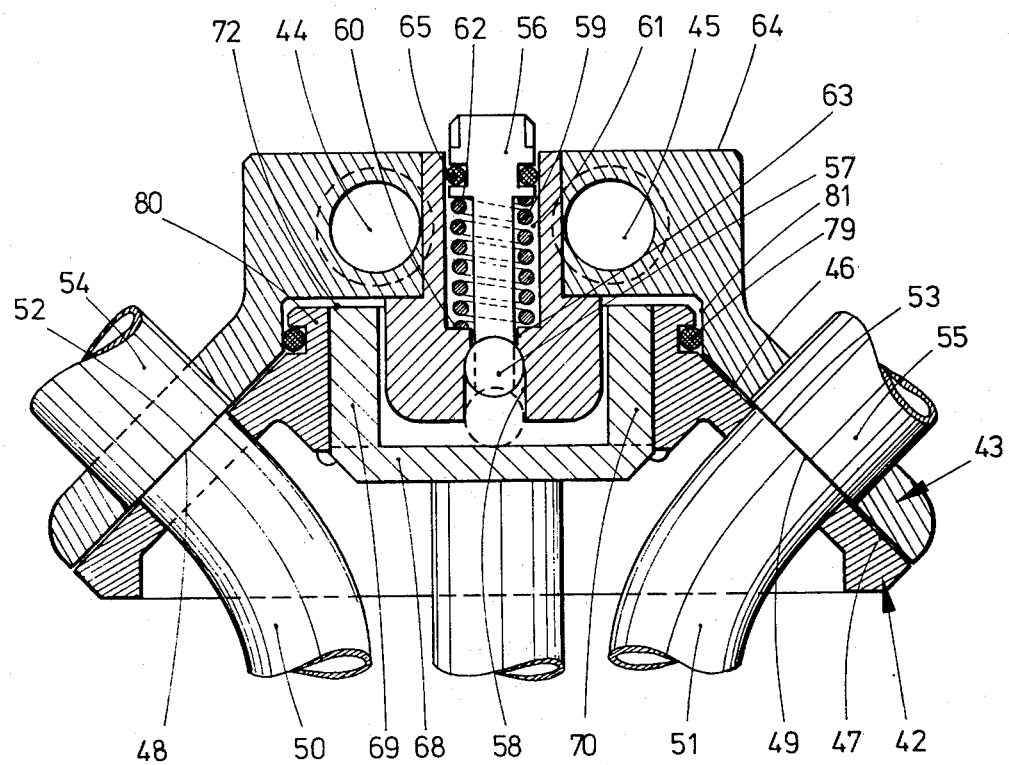
FIG. 4 is a vertical longitudinal cross-sectional view of a different embodiment of a collecting piece.

An embodiment similar to the one in FIG. 1 is illustrated in FIG. 4 and differs from said embodiment only in the type of connection between the upper and the lower parts 42 and 43 and the type of locking mechanism for the respective rotary positions. The supply conduits for the pulsator pressure which correspond with the conduits 22 and 23 in FIG. 1 are only indicated in the upper inverted cup-shaped part 43, while the remaining connections as supply conduits to the individual milking cups are not illustrated. The upper part 43 has also a conical sliding surface on its inner underside, while the lower part 42 has a corresponding conical sliding surface 47 on its upper side. The lower and the upper parts 42 and 43 are illustrated in such a position that the openings 48 and 49 terminating flush with the lower sliding surface 47 and of the milk discharge conduits 50 and 51 are aligned with the openings 52 and 53 of the connections 54 and 55 and which terminate flush with the upper sliding surface 46. The connections 54 and 55 can be connected to each inner chamber of a milking cup.

Concentrical with respect to the axis of rotation of the lower and the upper parts 42 and 43, there is arranged a push rod 56 which is movable in longitudinal direction of said axis of rotation. The push rod 56 has at its lower end a cylindrical pin 57 which is guided in a vertically extending slot 58 in the upper part 43. A helical spring 59 acts in such a manner between a shoulder 60 in an opening 61 and a flange 62 on the push rod 56, that the pin 57 is urged into engagement with a shoulder 63 in the slot 58. In this rest position, the upper end of the push rod 56 projects upwardly beyond the upper surface 64 of the upper part 43. Applying a pressure onto the upper end of the push rod 56 will cause the pin 63 to be moved downwardly into the broken-line position. Due to the fact that the pin 57 is guided in the slot 58, the push rod 56 is movable in axial direction, however, is fixed against rotation in relationship to the upper part 43. Thus the pin 57 is rotated together with a rotation of the upper part 43. An O-ring 65 is inserted into a recess in the flange 62 of the push rod 56, which O-ring seals off the push rod against the opening 61.

The pin 57 has a sufficient length such that its ends project laterally beyond the slot 58 and project in the form of a bayonet lock into guideways 66 and 67 (FIG. 5), which are recessed in the sidewalls 69, 70 of a cup-shaped part 68. The cup-shaped part 68 is fixedly connected to the lower part 42 to form an altogether truncated-cone-shaped part.

Figure 5:
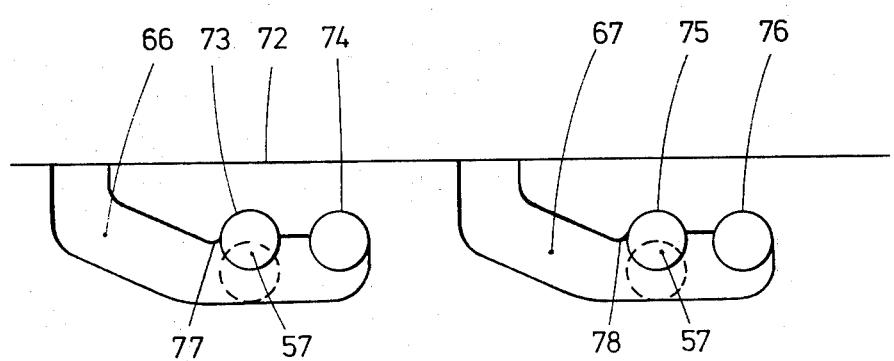
FIG. 5 is an unrolled illustration of the guideways for the bayonet lock.

The guideways 66 and 67 which are illustrated in an unrolled condition in FIG. 5 each start at the upper side 72 of the cup-shaped part 68. During a joining of the parts 42 and 43, the ends of the pin 57 are introduced by an axial movement of the parts toward one another into the guideways 66 and 67 and are then guided on in said guideways corresponding with a bayonet-type lock by rotating the parts 42 and 43 relative to one another. The guideways each have two notches 73, 74 and 75, 76, into which the ends of the pin 57 can be received. The notches 73 and 75 correspond with a first rotary position and the notches 74 and 76 correspond with a second rotary position of the two parts 42 and 43 relative to one another. All openings in the sliding surfaces 46 and 47 are aligned with one another in the first rotary position, while in the second rotary position, all openings are closed off by the sliding surfaces. To prevent an accidental, unintended opening of the bayonet lock, each stop in the form of an elevation 77 and 78 are provided in the cam surfaces of the guideways 66 and 67. Said elevations are constructed such that they are not overcome during a normal rotation of the parts 42 and 43 relative to one another. In order to overcome them, the push rod 56 must additionally be pressed inwardly or downwardly, so that the pin 57 will lie in the position which is illustrated in broken lines in the guideways 66 and 67 (FIG. 5). In this position then, during a rotation of the parts 42 and 43 relative to one another, an opening of the bayonet lock is possible.

To prevent a penetration of milk into the chambers of the bayonet lock, aside from the already mentioned O-ring 65, a further O-ring 79 is provided, which is arranged in a suitable ring recess in a short cylindrical extension piece of the part 42 which as a whole is approximately truncated-cone-shaped. The O-ring 79 lies sealingly against the inner wall 81 of the upper part 43.

Figure 7:
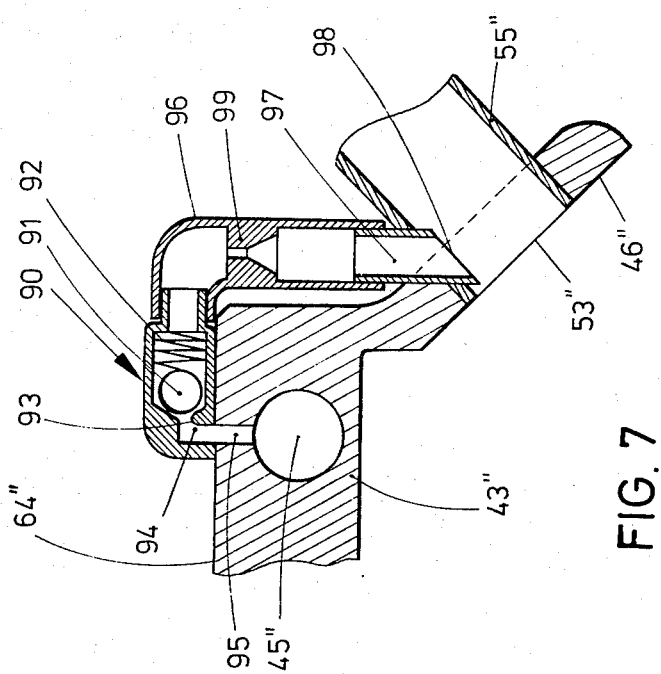
FIG. 7 is an illustration similar to FIG. 6 of a different embodiment of a collecting piece, wherein only the right part of the upper part of the collecting piece corresponds with FIG. 4.
Figure 6:
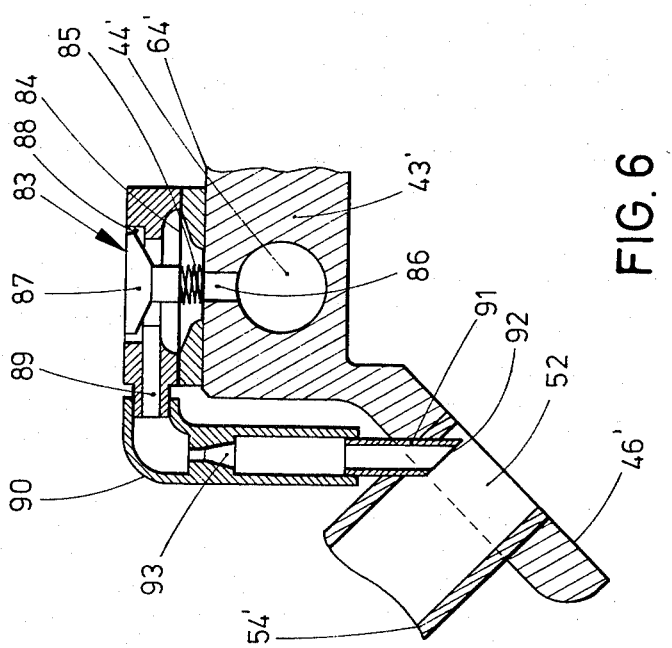
FIG. 6 illustrates a further exemplary embodiment, wherein only one upper half of the collecting piece according to FIG. 4 is illustrated.

FIGS. 6 and 7 are fragmentary views of embodiments which are modifications of the embodiment of FIG. 4. The parts which correspond with FIG. 4 are identified by the same reference numerals with the addition of a single and a double prime suffix. A valve 83 is mounted in FIG. 6 on the upper side 64' of the upper part 43'. The valve 83 has a diaphragm 84, the one side of which is initially tensioned by a spring 85. Said side of the diaphragm is simultaneously connected to the pulsator line 44' through an opening 86. A closure plug 87 is fastened to the other side of the diaphragm, which plug, in the closed condition of the valve, rests against a valve seat 88 and thus prevents a connection of the atmosphere to the inside of a line 89. The line 89 is connected through a transparent pipe 90 to a conduit connection 91, extending into the supply line 54' to the inside of a milking cup. The end 92 which projects into said supply line is cut off preferably parallel with respect to the inner wall of the connection 54'. A restrictor orifice 93 is furthermore constructed in said transparent pipe 90, which restrictor orifice limits the rate of air flow through the pipe 90. The size of the opening of the throttle 93 lies approximately in the region of 1 mm.

The valve functions such that the closure plug 87 rests sealingly against the valve seat 88 when in the suction phase, both in the connection 54' and also in the pulsator underpressure pipe 44', there exists an underpressure. However, as soon as the relief phase starts, the pressure in the pulsator underpressure pipe 44' increases, the closure plug 87 is lifted off from the valve seat 88 and the valve is opened therewith, so that atmospheric air can penetrate through the line 89, the pipe 90 and the conduit connection 91 into the connection 54' and thus inside of a milking cup. In this manner, a pressure relief of the teat in the milking cup takes place. When the pressure in the pulsator pressure line 44' enters the suction phase, the valve 83 is again closed and thus the inflow of atmospheric air is stopped.

A check valve 190 is provided in FIG. 7 on the upper surface 64" of the upper part 43". The check valve has a ball 191 which is spring urged against a valve seat 193 by a spring 192. The valve seat 193 is connected through a passageway 94 and an opening 95 to the pulsator underpressure line 45". On the other hand, the check valve is connected to a conduit connection 97 through a transparent pipe 96, which projects into the connection 55", which is connected to the inside of one of the milking cups. The conduit connection 97 projects in such a manner a small distance into the connection 55" so that it forms a kind of a drip nose. At the same time, the end 98 of the conduit connection 97, which end projects into the connection 55" is cut off parallel with respect to the inner wall of the connection 55". A throttle orifice 99 with a minimum opening of approximately 1 mm. is provided in the pipe 96.

The check valve 190 serves as a pressure relief valve and operates such that it is closed, if during the suction cycle the underpressure exists in the milking cup and in the pulsator underpressure line 45" and in the connection 55". If, however, at the start of the relief cycle the pressure is increased in the pulsator underpressure line 45", then the check valve opens up during an exceeding of a predetermined pressure and permits air to flow from the pulsator underpressure line 45" through the line 96 and the conduit connection 97 into the connection 55" and thus inside of the milking cup. If, however, the pressure in the pulsator underpressure line 45" is reduced again during the suction cycle, the check valve closes again automatically.

To improve the sliding between the sliding surfaces, it is preferable if the distributor piece is manufactured of metal, to coat one of these surfaces with a solid material, such as a polymeric plastic. A coating with polytetrafluoroethylene (Teflon) has been proven as particularly favorable.

Although particular preferred embodiments of the invention have been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A collecting piece for use in the hose line between a milking machine and the individual milking cups to control the supply of a vacuum to said individual milking cups while simultaneously maintaining the milk supplied from each of said milking cups separate from one another, said collecting piece comprising:
   a first cup-shaped member having a bottom wall and a first conically enlarging side wall extending away from said bottom wall, the inner surface of said conical wall defining a first sliding surface;
   a second cup-shaped member having a bottom wall and a second conically enlarging wall extending away from said bottom wall, the outer surface of said second conical wall defining a second sliding surface parallel to said first sliding surface, said first sliding surface sealingly and slidingly engaging said second sliding surface;
   first means supporting said first and second cup-shaped members for relative movement between first and second positions so that said first and second sliding surfaces slidingly engage each other during the entirety of said movement;
   plural supply lines connected to and extending through said first cup-shaped member, said plural supply lines each terminating flush with said first sliding surface; and
   plural discharge lines equal in number to said supply lines connected to and extending through second cup-shaped member, said plural discharge lines each terminating flush with said second sliding surface and in axial alignment with a respective one of said plural supply lines when said first and second cup-shaped members are in said first position, said supply lines and said discharge lines being out of axial alignment when said first and second cup-shaped members are in said second position to block the vacuum supply to and the milk supply from said individual milking cups.

2. A collecting piece according to claim 1, wherein at least one of said first cup-shaped member has a pulsator pressure distributor piece thereon, said pulsator pressure distributor piece having at least one further supply line connected to a pair of conduit connections adapted to be connected to the pulsator pressure inlets on selected ones of said individual milking cups.

3. The collecting piece according to claim 1, wherein at least one of said first and second sliding surfaces is coated with a solid material which improves the sliding.

4. The collecting piece according to claim 3, wherein said material consists of a polytetrafluoroethylene.

5. The collecting piece according to claim 1, wherein locking mechanisms which cooperate with one another are provided on said first and second cup-shaped members, which mechanisms engage one another in said first and said second positions of said first and second cup-shaped members to said members in said positions.

6. The collecting piece according to claim 5, wherein said locking mechanisms include a push rod provided in said bottom wall of said first cup-shaped member, which push rod extends concentrically in axial direction through said first member, is initially tensioned outwardly by a spring and has an end which projects outwardly beyond the outer surface of said bottom wall of said first cup-shaped member, wherein on a further end of said push rod remote from said end there is secured a pin which extends transversely to the longitudinal axis of said push rod, second means supporting said push rod for axial movement, however, fixed against rotation relative to said first cup-shaped member, and wherein in said bottom wall of said second cup-shaped member facing said bottom wall of said first cup-shaped member there are constructed two guideways which receive the ends of said pin therein.

7. The collecting piece according to claim 6, wherein said guideways have two locking recesses which correspond with said first and second positions.

8. The collecting piece according to claim 6, wherein said guideways have between an inlet opening for each thereof and the locking recesses for locating said first and the second positions a stop means for preventing an inadvertent passage of said pin out of said guideways and into said guideways and permitting a passage of said pin out of said guideways and into said inlet only by an axial inward movement of said push rod and a simultaneous rotation of said first and second cup-shaped members relative to one another.

9. A collecting piece according to claim 1, wherein said first cup-shaped member has a pulsator pressure distributor piece thereon, said pulsator pressure distributor piece having a pair of further supply lines each connected to a pair of conduit connections adapted to be connected to the pulsator pressure inlets on said individual milking cups.

10. A collecting piece according to claim 9, wherein each of said further supply lines terminate flush with said first sliding surface, wherein said each of said conduit connectors terminate flush with said second sliding surface, said terminal ends of said further supply lines being axially aligned with said terminal ends of said conduit connections when said first and second cup-shaped members are in said first position and are blocked from one another when said first and second cup-shaped members are in said second position.

11. The collecting piece according to claim 10, wherein on the pulsator pressure distributor piece there is provided at least one pressure relief valve having a diaphragm, one side of which is initially tensioned by a spring and is connected in fluid circuit to said pulsator pressure distributor piece, the other side of which is connected to a movable closure plug, which normally interrupts a connecting line supplying atmospheric air to the inside of a supply line.

12. The collecting piece according to claim 10, wherein on the pulsator pressure distributor piece there is provided at least one pressure relief valve which consists of a ball check valve, which is connected on one side thereof to the pulsator pressure distributor piece and on the other side to said supply line through a connecting line.

13. The collecting piece according to claim 11 or 12, wherein said connecting line between said pressure relief valve and said supply line is transparent.

14. The collecting piece according to claim 13, wherein said connecting line projects a distance into said supply line and is arranged such that the projecting end is visible when said collecting piece is disassembled.

* * * * *